United States Patent

Ohmae et al.

(10) Patent No.: US 9,162,704 B2
(45) Date of Patent: Oct. 20, 2015

(54) PID CONTROL SYSTEM

(71) Applicant: JTEKT CORPORATION, Osaka-shi, Osaka (JP)

(72) Inventors: Hideto Ohmae, Tsukuba (JP); Masahiko Sakamaki, Yao (JP)

(73) Assignee: JTEKT CORPORATION, Osaka-shi (JP)

( * ) Notice: Subject to any disclaimer, the term of this patent is extended or adjusted under 35 U.S.C. 154(b) by 135 days.

(21) Appl. No.: 14/054,967

(22) Filed: Oct. 16, 2013

(65) Prior Publication Data

US 2014/0114535 A1 Apr. 24, 2014

(30) Foreign Application Priority Data

Oct. 24, 2012 (JP) .................................. 2012-234940

(51) Int. Cl.
*B60T 8/1755* (2006.01)
*B62D 5/09* (2006.01)

(52) U.S. Cl.
CPC ...................................... *B62D 5/091* (2013.01)

(58) Field of Classification Search
CPC ............ B62D 5/091; B62D 6/00; B62D 5/04; B62D 5/0436; B62D 7/159; G06F 19/00; G06F 7/00; G06G 7/00; B60T 8/24; B60W 30/00; B60W 10/18; B60W 10/10; B25D 5/0463; B25D 5/083; F16H 47/08
USPC .......... 701/42, 53, 69, 70, 41; 91/370; 475/70
See application file for complete search history.

(56) References Cited

U.S. PATENT DOCUMENTS

| | | | | |
|---|---|---|---|---|
| 3,164,034 A * | 1/1965 | Kelley | ............................. | 475/70 |
| 4,665,797 A * | 5/1987 | Bacardit | ......................... | 91/370 |
| 5,274,555 A * | 12/1993 | Fukunaga et al. | ............. | 701/42 |
| 5,317,513 A * | 5/1994 | Mouri | ............................. | 701/42 |
| 6,370,459 B1 * | 4/2002 | Phillips | .......................... | 701/41 |
| 6,615,124 B1 * | 9/2003 | Adachi | ............................ | 701/70 |
| 2004/0083822 A1 | 5/2004 | Mukai et al. | | |
| 2004/0186640 A1 * | 9/2004 | Norito | ............................. | 701/41 |
| 2006/0261766 A1 | 11/2006 | Nakagawa et al. | | |
| 2007/0185638 A1 | 8/2007 | Odenthal et al. | | |
| 2012/0065850 A1 * | 3/2012 | Matsuno | .......................... | 701/53 |
| 2012/0253620 A1 * | 10/2012 | Handa | ............................. | 701/69 |

FOREIGN PATENT DOCUMENTS

| | | |
|---|---|---|
| JP | A-6-138905 | 5/1994 |
| JP | A-2004-130899 | 4/2004 |
| JP | A-2006-325313 | 11/2006 |
| JP | A-2008-506587 | 3/2008 |

* cited by examiner

*Primary Examiner* — Tuan C. To
*Assistant Examiner* — Yuri Kan
(74) *Attorney, Agent, or Firm* — Oliff PLC

(57) ABSTRACT

In a PID control system, a proportionality coefficient multiplication unit multiplies a valve opening degree command value by a proportionality coefficient. A first angle deviation computation unit computes a deviation between an output value from a proportionality coefficient multiplication unit and a detected rotation angle of a valve driving motor. A differential coefficient multiplication unit multiplies the valve opening degree command value by a differential coefficient. A third angle deviation computation unit computes a deviation between an output value from the differential coefficient multiplication unit and the detected rotation angle of the valve driving motor.

2 Claims, 7 Drawing Sheets

PID CONTROL SYSTEM

INCORPORATION BY REFERENCE

The disclosure of Japanese Patent Application No. 2012-234940 filed on Oct. 24, 2012 including the specification, drawings and abstract, is incorporated herein by reference in its entirety.

BACKGROUND OF THE INVENTION

1. Field of the Invention

The invention relates to a proportional-integral-derivative (PID) control system.

2. Description of Related Art

There has been known a hydraulic power steering system in which hydraulic fluid from a hydraulic pump is supplied through a hydraulic control valve to a power cylinder connected to a steering mechanism of a vehicle, whereby steering is assisted. In a commonly-used hydraulic power steering system, a hydraulic control valve is mechanically connected to a steering member, such as a steering wheel, via a steering shaft, and an opening degree of the hydraulic control valve is adjusted in response to an operation of the steering member. Refer to, for example, Japanese Patent Application Publication No. 2006-325313 (JP 2006-325313 A), Japanese Patent Application Publication No. 2004-130899 (JP 2004-130899 A), Japanese Patent Application Publication No. 6-138905 (JP 6-138905 A), and Japanese Patent Application Publication No. 2008-506587 (JP 2008-506587 A).

There has been developed a hydraulic power steering system in which a hydraulic control valve is not mechanically connected to a steering member, and an opening degree of the hydraulic control valve is controlled by an electric motor (valve driving motor). The inventors et al. have conducted research on a system that controls a valve driving motor through PID control, and finally made the invention.

SUMMARY OF THE INVENTION

One object of the invention is to provide a proportional-integral-derivative (PID) control system with which the target value following characteristic is improved without deteriorating the disturbance suppression characteristic.

A PID control system according to an aspect of the invention, includes: a control element that controls a controlled object; a target value setting unit that sets a target value; a controlled variable detector that detects a controlled variable of the controlled object; a PID controller that executes PID control on the control element such that the controlled variable detected by the controlled variable detector coincides with the target value set by the target value setting unit; a proportionality coefficient setting unit that sets a proportionality coefficient; a differential coefficient setting unit that sets a differential coefficient; a proportionality coefficient multiplier that multiplies the target value set by the target value setting unit, by the proportionality coefficient set by the proportionality coefficient setting unit; a differential coefficient multiplier that multiplies the target value set by the target value setting unit, by the differential coefficient set by the differential coefficient setting unit; a first deviation computation unit that computes a deviation between an output value from the proportionality coefficient multiplier and the controlled variable detected by the controlled variable detector; a second deviation computation unit that computes a deviation between the target value set by the target value setting unit and the controlled variable detected by the controlled variable detector; and a third deviation computation unit that computes a deviation between an output value from the differential coefficient multiplier and the controlled variable detected by the controlled variable detector.

The PID controller includes: a proportional element that computes a proportional operation amount based on the deviation computed by the first deviation computation unit, an integral element that computes an integral operation amount based on the deviation computed by the second deviation computation unit, and a differential element that computes a differential operation amount based on the deviation computed by the third deviation computation unit.

With this configuration, by adjusting the proportionality coefficient and the differential coefficient, overshoot of response to changes in the target value is suppressed without changing the disturbance suppression characteristic. Thus, the target value following characteristic is improved without deteriorating the disturbance suppression characteristic.

A PID control system according to another aspect of the invention includes: a control element that controls a controlled object; a target value setting unit that sets a target value; a controlled variable detector that detects a controlled variable of the controlled object; a PID controller that executes PID control on the control element such that the controlled variable detected by the controlled variable detector coincides with the target value set by the target value setting unit; a filter that executes low-pass filter processing on the target value set by the target value setting unit; and a deviation computation unit that computes a deviation between the target value after the low-pass filter processing executed by the filter and the controlled variable detected by the controlled variable detector. The PID controller includes a proportional element that computes a proportional operation amount based on the deviation computed by the deviation computation unit, and an integral element that computes an integral operation amount based on the deviation computed by the deviation computation unit.

In this configuration, low-pass filter processing is executed on the target value by filter, the deviation between the target value after the low-pass filter processing, and the controlled variable is computed, and the proportional operation amount and the integral operation amount are computed based on the deviation. The target value is caused to change gradually by the filter, and therefore overshoot of response to changes in the target value is suppressed. Even if such a filter is provided, the disturbance suppression characteristic remains unchanged. Therefore, the target value following characteristic is improved without deteriorating the disturbance suppression characteristic.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
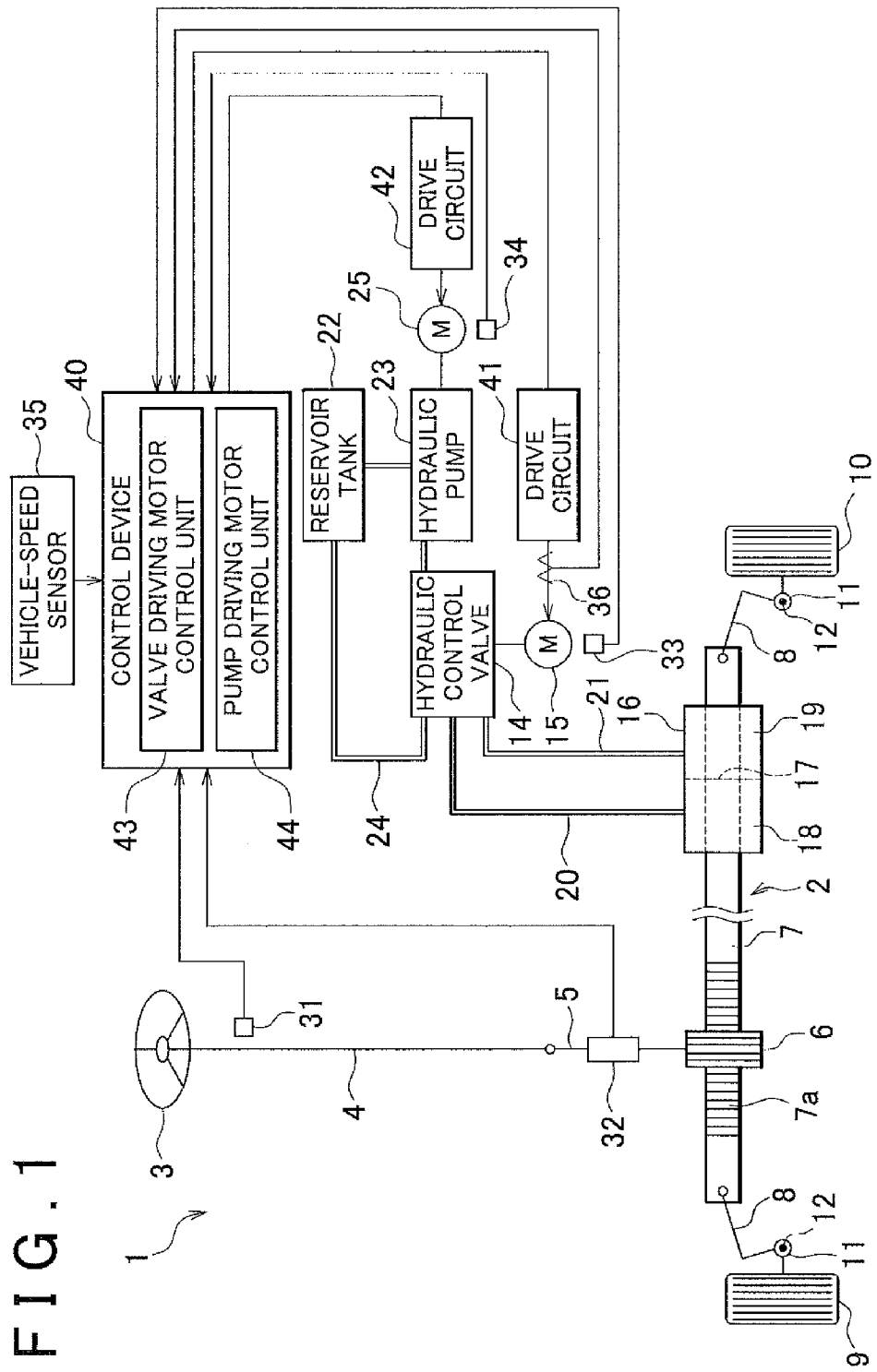
FIG. 1 is a schematic view illustrating the schematic structure of a hydraulic power steering system to which a proportional-integral-derivative (PID) control system according to an embodiment of the invention is applied.

FIG. 1 is a schematic view illustrating the schematic structure of a hydraulic power steering system 1 to which a proportional-integral-derivative (PID) control system according to an embodiment of the invention is applied. The hydraulic power steering system 1 is used to apply steering assist force to a steering mechanism 2 of a vehicle. The steering mechanism 2 includes a steering wheel 3 that serves as a steering member operated by a driver in order to steer the vehicle, a steering shaft 4 connect to the steering wheel 3, a pinion shaft 5 that is connect to a distal end portion of the steering shaft 4 and has a pinion gear 6, and a rack shaft 7 that serves as a steered shaft that has a rack 7a meshed with the pinion gear 6, and extends in the lateral direction of the vehicle.

Tie rods 8 are connected to respective ends of the rack shaft 7, and the tie rods 8 are connected to respective knuckle arms 11 that support right and left steered wheels 10, 9. The knuckle arms 11 are provided so as to be pivotable about respective king pins 12. As the steering wheel 3 is operated and thus the steering shaft 4 is rotated, the rotation is converted into a linear motion of the rack shaft 7 along its axial direction by the pinion gear 6 and the rack 7a. The linear motion is converted into pivot motions of the knuckle arms 11 about the king pins 12, and the right and left steered wheels 10, 9 are thus steered.

A steering angle sensor 31 used to detect a steering angle that is a rotation angle of the steering shaft 4 is arranged around the steering shaft 4. In the present embodiment, the steering angle sensor 31 detects a rotation angle of the steering shaft 4 in both the forward and reverse rotation directions from a neutral position of the steering shaft 4. The steering angle sensor 31 outputs a rotation angle in the clockwise direction from the neutral position as, for example, a positive value, and outputs a rotation angle to the counterclockwise direction from the neutral position as, for example, a negative value. A torque sensor 32 used to detect a steering torque Th is provided on the pinion shaft 5.

The hydraulic power steering system 1 includes a hydraulic control valve 14, a power cylinder 16, and a hydraulic pump 23. The hydraulic control valve 14 is, for example, a rotary valve, and includes a rotor housing (not shown) and a rotor (not shown) used to switch the flow direction of hydraulic fluid. As the rotor of the hydraulic control valve 14 is rotated by an electric motor 15 (hereinafter, referred to as "valve driving motor 15"), the opening degree of the hydraulic control valve 14 is controlled. The valve driving motor 15 is formed of a three-phase brushless motor. A rotation angle sensor 33, which is formed of, for example, a resolver that detects a rotation angle θv of a rotor of the valve driving motor 15, is arranged near the valve driving motor 15.

The hydraulic control valve 14 is connected to the power cylinder 16 that applies steering assist force to the steering mechanism 2. The power cylinder 16 is connected to the steering mechanism 2. The power cylinder 16 has a piston 17 provided integrally with the rack shaft 7, and a pair of cylinder chambers 18, 19 divided by the piston 17. The cylinder chambers 18, 19 are connected to the hydraulic control valve 14 through corresponding oil passages 20, 21, respectively.

The hydraulic control valve 14 is arranged at an intermediate portion of an oil circulation passage 24 that passes a reservoir tank 22 and the hydraulic pump 23 that generates steering assist force. The hydraulic pump 23 is formed of, for example, a gear pump, is driven by an electric motor 25 (hereinafter, referred to as "pump driving motor 25"), draws the hydraulic fluid stored in the reservoir tank 22, and supplies the hydraulic fluid to the hydraulic control valve 14. Excess hydraulic fluid is returned to the reservoir tank 22 from the hydraulic control valve 14 through the oil circulation passage 24.

The pump driving motor 25 is driven to be rotated in one direction and drives the hydraulic pump 23. An output shaft of the pump driving motor 25 is connected to an input shaft of the hydraulic pump 23. As the output shaft of the pump driving motor 25 rotates, the input shaft of the hydraulic pump 23 rotates to drive the hydraulic pump 23. The pump driving motor 25 is formed of a three-phase brushless motor. A rotation angle sensor 34, which is formed of, for example, a resolver that detects a rotation angle of a rotor of the pump driving motor 25, is arranged near the pump driving motor 25.

When the rotor of the hydraulic control valve 14 is rotated by the valve driving motor 15 in one direction from a neutral position that is a reference rotation angle position, the hydraulic control valve 14 supplies the hydraulic fluid to one of the cylinder chambers 18, 19 of the power cylinder 16 through a corresponding one of the oil passages 20, 21, and returns the hydraulic fluid in the other one of the cylinder chamber 18, 19 to the reservoir tank 22. When the rotor of the hydraulic control valve 14 is rotated in the other direction by the valve driving motor 15 from the neutral position, the hydraulic control valve 14 supplies the hydraulic fluid to the other one of the cylinder chambers 18, 19 through the other one of the oil passages 20, 21, and returns the hydraulic fluid in the one of the cylinder chambers 18, 19 to the reservoir tank 22.

When the rotor of the hydraulic control valve 14 is at the neutral position, the hydraulic control valve 14 is brought into a condition of equilibrium, that is, steering is in a neutral state, the pressures in both the cylinder chambers 18, 19 of the power cylinder 16 are maintained equal to each other and the hydraulic fluid circulates through the oil circulation passage 24. Once the rotor of the hydraulic control valve 14 is rotated by the valve driving motor 15, the hydraulic fluid is supplied to one of the cylinder chambers 18, 19 of the power cylinder 16, and the piston 17 moves along the vehicle-width direction (lateral direction of the vehicle). Thus, steering assist force acts on the rack shaft 7.

The steering angle detected by the steering angle sensor 31, the steering torque Th detected by the torque sensor 32, a signal output from the rotation angle sensor 33, a signal output from the rotation angle sensor 34, a vehicle speed Sp detected by a vehicle-speed sensor 35, and a signal output from a current sensor 36 used to detect a current passing through the valve driving motor 15 are input into a control device 40 that is formed of a computer. The control device 40 controls the valve driving motor 15 through a drive circuit 41, and controls the pump driving motor 25 through a drive circuit 42.

The control device 40 includes a valve driving motor control unit 43 that controls the drive circuit 41 of the valve driving motor 15, and a pump driving motor control unit 44 that controls the pump driving motor 25. The valve driving motor control unit 43 constitutes a PID control system according to the embodiment of the invention. The valve driving motor control unit 43 will be described later.

The pump driving motor control unit 44 controls the pump driving motor 25 in, for example, the following manner. The pump driving motor control unit 44 computes a rotation speed of the pump driving motor 25 based on a signal output from the rotation angle sensor 34. The pump driving motor control unit 44 computes a steering angular velocity by differentiating a value output from the steering angle sensor 31.

The pump driving motor control unit 44 computes a rotation speed command value for the pump driving motor 25 based on the steering angular velocity. The rotation speed command value is set to a predetermined value when the steering angular velocity is zero, and is set to a larger value as the steering angular velocity is higher. The pump driving motor control unit 44 controls the drive circuit 42 for the pump driving motor 25 such that the rotation speed of the pump driving motor 25 becomes equal to the rotation speed command value. The pump driving motor control unit 44 may control the drive circuit 42 such that the rotation speed of the pump driving motor 25 becomes equal to a predetermined speed set in advance.

Figure 5:
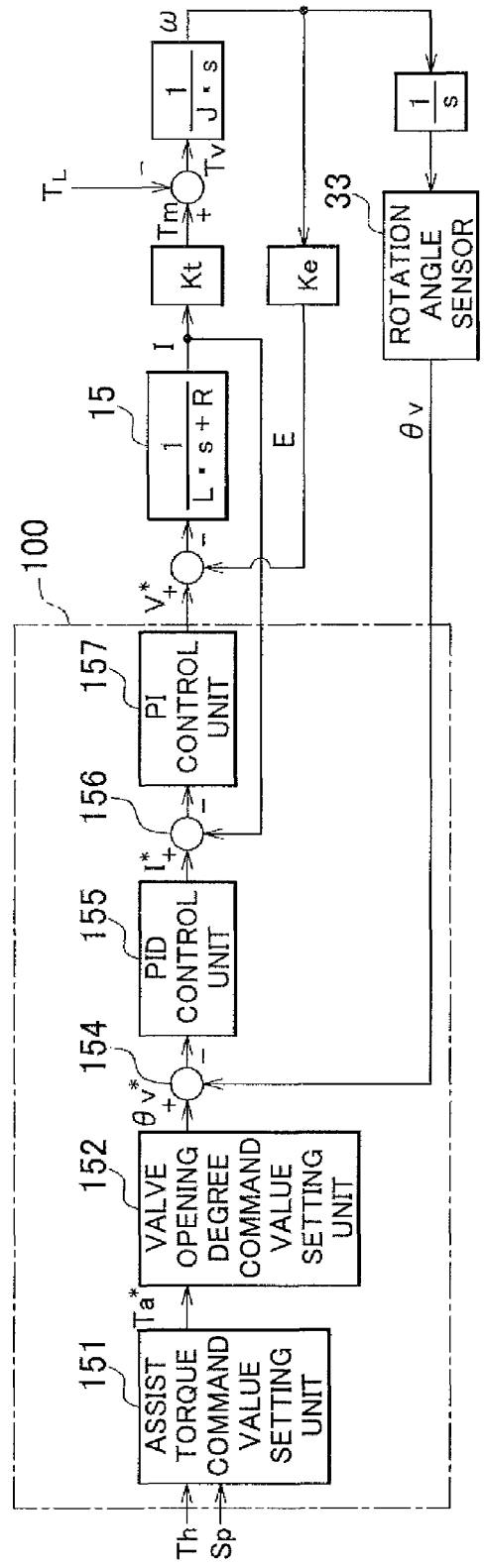
FIG. 5 is a control block diagram (reference diagram) illustrating a valve driving motor control unit that has already been developed by the inventors of the present invention.

Prior to the description of the valve driving motor control unit 43, a valve driving motor control unit, which has been already developed by the inventors of the present invention, will be described with reference to FIG. 5. FIG. 5 is a control block diagram (reference diagram) of a valve driving motor control unit 100 that has already been developed by the inventors of the present invention. The valve driving motor control unit 100 includes an assist torque command value setting unit 151, a valve opening degree command value setting unit 152, an angle deviation computation unit 154, a PID control unit 155, a current deviation computation unit 156, and a PI control unit 157, as function implementation units that are implemented through software processing.

Figure 6:
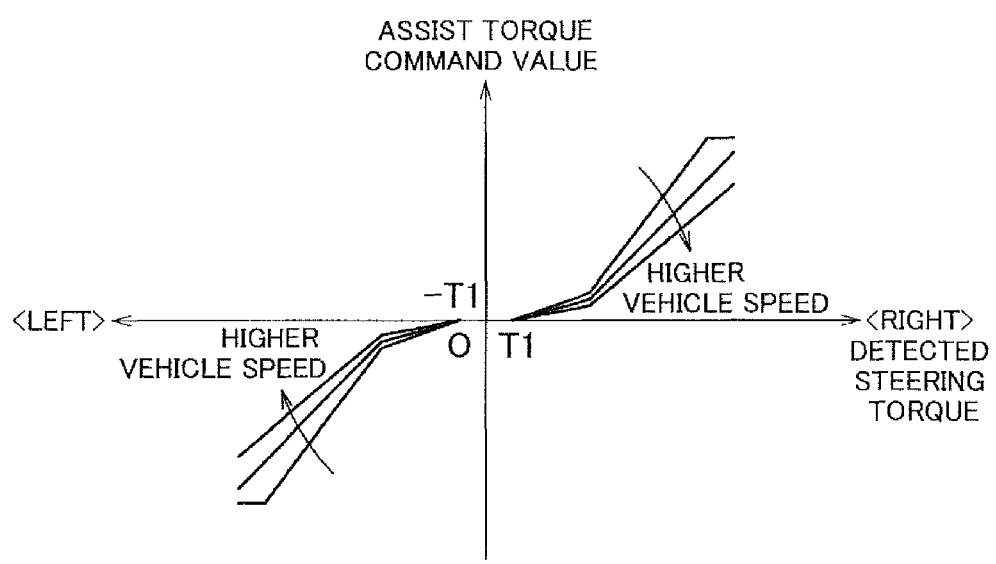
FIG. 6 is a graph illustrating an example of a manner of setting an assist torque command value with respect to a detected steering torque.

The assist torque command value setting unit 151 sets an assist torque command value Ta*[N·m] that is a command value of assist torque that should be generated by the power cylinder 16, based on the detected steering torque Th detected by the torque sensor 32 and the vehicle speed Sp detected by the vehicle-speed sensor 35. Specifically, the assist torque command value setting unit 151 sets the assist torque command value Ta* based on a map that stores the relationship between the detected steering torque and the assist torque command value for each vehicle speed. FIG. 6 is a graph illustrating an example of a manner of setting the assist torque command value with respect to the detected steering torque.

The detected steering torque Th takes a positive value when the torque is used to steer the vehicle to the right, and takes a negative value when the torque is used to steer the vehicle to the left. The assist torque command value Ta* takes a positive value when assist torque for steering the vehicle to the right is generated by the power cylinder 16, and takes a negative value when assist torque for steering the vehicle to the left is generated by the power cylinder 16.

The assist torque command value Ta* takes a positive value with respect to a positive value of the detected steering torque Th, and takes a negative value with respect to a negative value of the detected steering torque Th. When the detected steering torque Th is a considerably small value within a range from −T1 to T1, the assist torque is set to zero. When the detected steering torque Th in a region outside the range from −T1 to T1, the assist torque command value Ta* is set such that the larger the absolute value of the detected steering torque Th is, the larger the absolute value of the assist torque command value Ta* is. Further, the assist torque command value Ta* is set such that the higher the vehicle speed Sp detected by the vehicle-speed sensor 35 is, the smaller the absolute value of the assist torque command value Ta* is.

The valve opening degree command value setting unit 152 sets a valve opening degree command value (motor rotation angle command value) θv* [deg] that is a command value of an opening degree of the hydraulic control valve 14 (command value of a rotation angle of the valve driving motor 15), based on the assist torque command value Ta* set by the assist torque command value setting unit 151. In this example, the rotation angle of the valve driving motor 15 is 0° when the rotor of the hydraulic control valve 14 is at a neutral position. When the rotation angle of the valve driving motor 15 becomes larger than 0°, the opening degree of the hydraulic control valve 14 is controlled such that assist torque for steering the vehicle to the right is generated by the power cylinder 16. On the other hand, when the rotation angle of the valve driving motor 15 becomes smaller than 0°, the opening degree of the hydraulic control valve 14 is controlled such that assist torque for steering the vehicle to the left is generated by the power cylinder 16. The larger the absolute value of the rotation angle of the valve driving motor 15 is, the larger the absolute value of the assist torque generated by the power cylinder 16 is.

The valve opening degree command value setting unit 152 sets the valve opening degree command value θv* based on a map that stores the relationship between the assist torque command value Ta* and the valve opening degree command value θv*.

Figure 7:
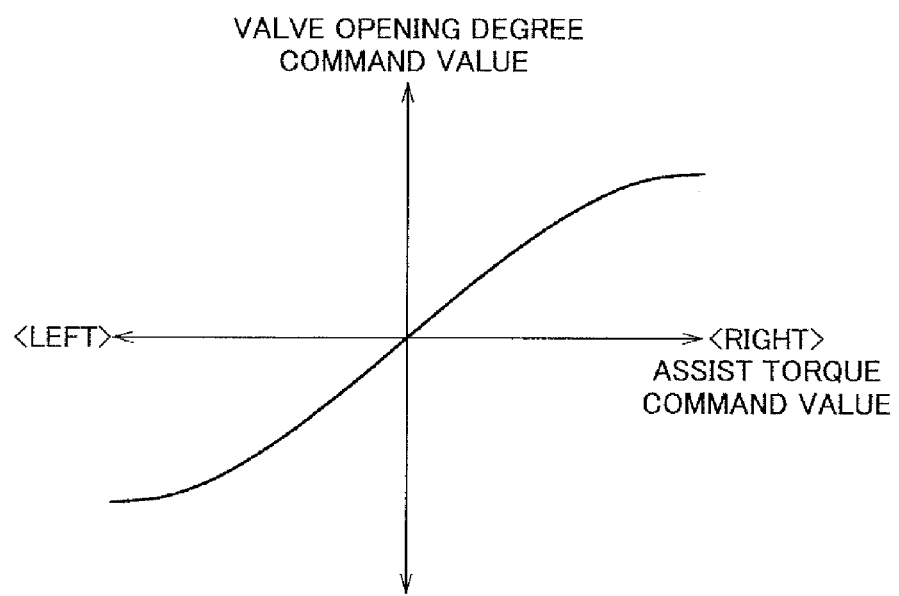
FIG. 7 is a graph illustrating an example of a manner of setting a valve opening degree command value with respect to an assist torque command value.

FIG. 7 is a graph illustrating an example of a manner of setting the valve opening degree command value θv* with respect to the assist torque command value Ta*. The valve opening degree command value θv* takes a positive value with respect to a positive value of the assist torque command value Ta*, and takes a negative value with respect to a negative value of the assist torque command value Ta*. The valve opening degree command value θv* is set such that the larger the absolute value of the assist torque command value Ta* is, the larger the absolute value of the valve opening degree command value θv* is.

The angle deviation computation unit 154 computes a deviation Δθv (=θv*−θv) between the valve opening degree command value θv* set by the valve opening degree command value setting unit 152 and the rotation angle (actual angle) θv of the valve driving motor 15, which is detected by the rotation angle sensor 33. The PID control unit 155 executes PID computation on the angle deviation Δθv computed by the angle deviation computation unit 154. The angle deviation computation unit 154 and the PID control unit 155 constitute a rotation angle feedback controller that causes the rotation angle θv of the valve driving motor 15 to follow the valve opening degree command value θv*. The PID control unit 155 computes a current command value I*[A] for the valve driving motor 15 by executing PID computation on the angle deviation Δθv.

The current deviation computation unit 156 computes a deviation ΔI (=I*−I) between the current command value I* obtained by the PID control unit 155, and a motor current (actual current) I [A] detected by the current sensor 36. The PI control unit 157 executes PI computation on the current deviation ΔI (=I*−I) computed by the current deviation computation unit 156. The current deviation computation unit 156 and the PI control unit 157 constitute a current feedback controller that causes a motor current I passing through the valve driving motor 15 to follow the current command value I*. The PI control unit 157 computes a voltage command value V* [V], which is a voltage that should be applied to the valve driving motor 15, by executing PI computation on the current deviation ΔI.

In FIG. 5, the valve driving motor 15 is expressed as a motor model that is a mathematical model. The motor model can be expressed as 1/(L·s+R). R is an armature winding resistance [Ω], L is an armature winding inductance [H], and s is a differential operator (Laplace operator). It is considered that the deviation between the voltage command values V* computed by the PI control unit 157 and an induced voltage E [V] is applied to the valve driving motor 15. Thus, the motor current I [A] passes through the valve driving motor 15. The motor current I is detected by the current sensor 36 and fed back to the current deviation computation unit 156.

A value obtained by multiplying the motor current I by a torque constant Kt [N·m/A] of the valve driving motor 15 is a motor torque Tm [N·m]. A value obtained by subtracting a load torque TL [N·m] from the rack shaft 7, from the motor torque Tm is a torque Tv [N·m] that is applied to the hydraulic control valve 14. A value obtained by multiplying the torque Tv by 1/(J·s) is a motor rotation speed ω [rad/s]. J is a motor inertia [kg·m$^2$], and s is a differential operator (Laplace operator). A value obtained by multiplying the motor rotation speed Ω by a counter electromotive voltage constant Ke [V·s/rad] of the valve driving motor 15 is the induced voltage E [V].

A value obtained by multiplying the motor rotation speed Ω by 1/s is a rotation angle of the valve driving motor 15. 1/s is an integration operator. The rotation angle sensor 33 detects a rotation angle [deg] of the valve driving motor 15. The rotation angle detected by the rotation angle sensor 33 is fed back to the angle deviation computation unit 154. The torque Tv that is applied to the hydraulic control valve 14 may be expressed as J·d$^2$ (θv)/dt$^2$.

In this way, feedback control is executed on the valve driving motor 15 such that the opening degree θv of the hydraulic control valve 14 coincides with the valve opening degree command value θv*. In the valve driving motor control unit 100, if the current feedback loop is omitted, the torque Tv (=J·d$^2$ (θv)/dt$^2$) that is applied to the hydraulic control valve 14 is expressed by Equation (1) indicated below. In Equation (1), Kp, Ki, and Kd are a proportional gain, an integral gain, and a differential gain, respectively, that are used in the PID control unit 155.

$$J\frac{d^2}{dt^2}\theta v = \left\{Kp(\theta v^* - \theta v) + Ki\int (\theta v^* - \theta v)dt + Kd\frac{d}{dt}(\theta v^* - \theta v)\right\}Kt - T_L \quad \text{Equation (1)}$$

After execution of Laplace transform on Equation (1), Equation (2) indicated below is obtained.

$$\theta v = \frac{Kd\cdot Kts^2 + Kp\cdot Kts + Ki\cdot Kt}{Js^3 + Kd\cdot Kts^2 + Kp\cdot Kts + Ki\cdot Kt}\theta v^* - \frac{s}{Js^3 + Kd\cdot Kts^2 + Kp\cdot Kts + Ki\cdot Kt}T_L \quad \text{Equation (2)}$$

In the right side of Equation (2), a formula, which is multiplied by θv*, indicates the response characteristic with respect to a target value (valve opening degree command value θv*), and a formula, which is multiplied by TL, indicates the response characteristic with respect to disturbance (load torque TL). A transfer function (target response transfer function of the PID control unit 155) G1(s) of a system where the current feedback loop is omitted is expressed by Equation (3) indicated below.

$$G1(s) = \frac{\theta v}{\theta v^*} = \frac{Kd\cdot Kts^2 + Kp\cdot Kts + Ki\cdot Kt}{Js^3 + Kd\cdot Kts^2 + Kp\cdot Kts + Ki\cdot Kt} \quad \text{(Equation 3)}$$

Also, a characteristic equation is expressed by Equation (4) indicated below.

$$Js^3 Kd\cdot Kts^2 + Kp\cdot Kts + Ki\cdot Kt = 0 \quad \text{Equation (4)}$$

When both sides of Equation (4) are divided by J, Equation (5) indicated below is obtained.

$$s^3 + \frac{Kd\cdot Kt}{J}s^2 + \frac{Kp\cdot Kt}{J}s + \frac{Ki\cdot Kt}{J} = 0 \quad \text{Equation (5)}$$

When Kp, Ki, and Kd are set such that the characteristic equation has a triple root (negative real number) of s=−α (where α is a positive real number), the control system becomes a system that has neither vibration nor a pole where convergence is slow. In order for the characteristic equation to have a triple root (negative real number) of s=−α, Equation (6) indicated below needs to be satisfied.

$$(s-(-\alpha))^3 = s^3 + 3\alpha s^2 + 3\alpha^2 s + \alpha = 0 \quad \text{Equation (6)}$$

From a comparison between Equation (5) and Equation (6), Kp, Ki and Kd are expressed by Equations (7), (8), and (9) indicated below, respectively, in order for the characteristic equation to have a triple root (negative real number) of s=−α.

$$Kp = 3\alpha^2 J/Kt \quad \text{Equation (7)}$$

$$Ki = \alpha^3 J/Kt \quad \text{Equation (8)}$$

$$Kd = 3\alpha J/Kt \quad \text{Equation (9)}$$

In other words, preferably, the proportional gain Kp, the integral gain Ki, and the differential gain Kd that are used in the PID control unit 155 are set so as to satisfy Equations (7), (8), and (9), respectively. In this case, α is a design parameter used to design target responsiveness.

Figure 2:
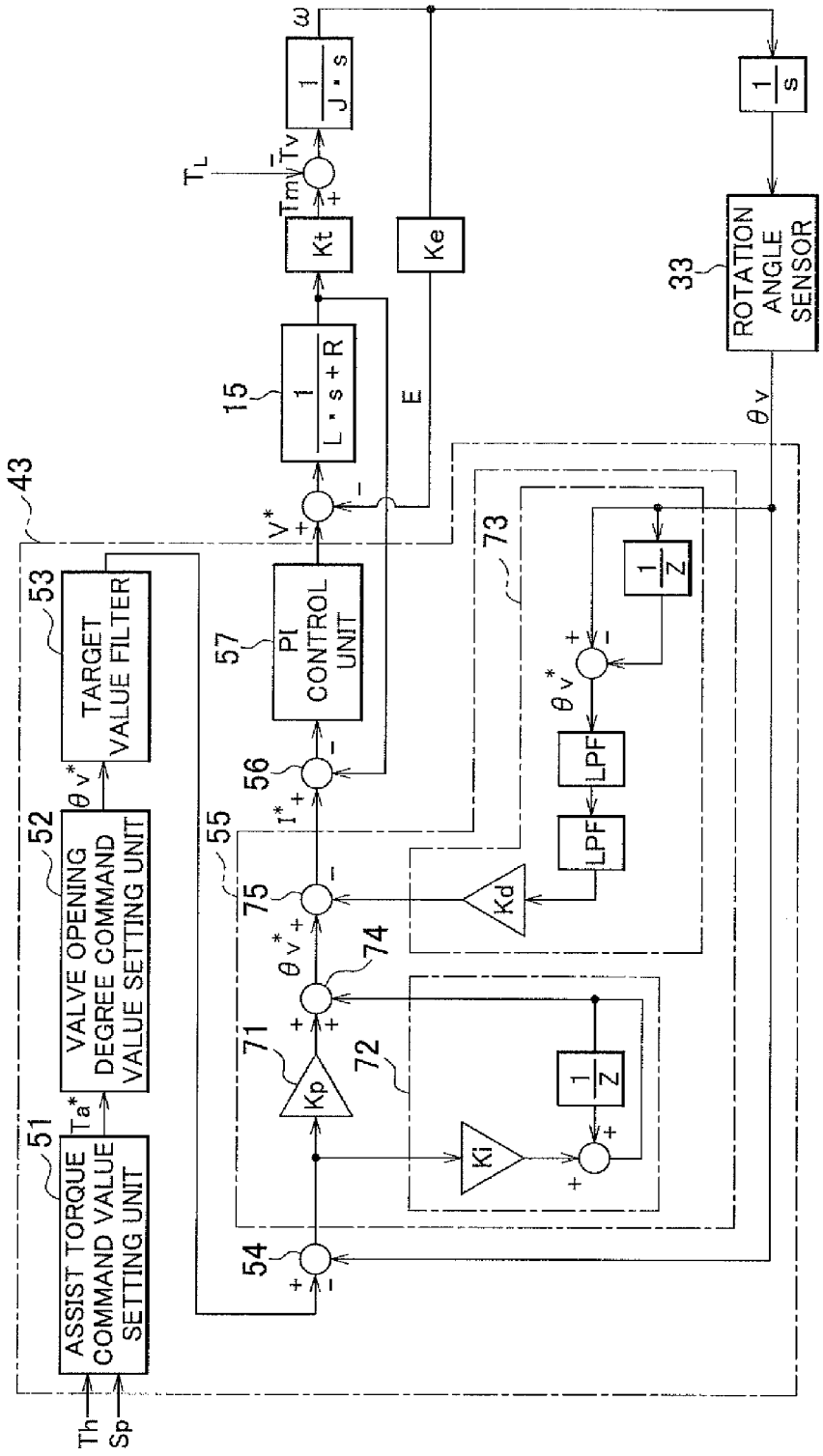
FIG. 2 is a control block diagram illustrating an example of a valve driving motor control unit.

The valve driving motor control unit 43 in the control device 40 in FIG. 1 will be described. FIG. 2 is a control block diagram of the valve driving motor control unit 43. The valve driving motor control unit 43 includes an assist torque command value setting unit 51, a valve opening degree command value setting unit 52, a target value filter 53, an angle deviation computation unit 54, a PID control unit 55, a current deviation computation unit 56, and a PI control unit 57 as function implementation units that are implemented through software processing.

Operations of the assist torque command value setting unit 51 and the valve opening degree command value setting unit 52 are the same as operations of the assist torque command value setting unit 151 and the valve opening degree command value setting unit 152 in FIG. 5, and therefore explanation thereof will be omitted. The target value filter 53 is formed of a low-pass filter. The target value filter 53 executes low-pass filter processing on a valve opening degree command value θv* set by the valve opening degree command value setting unit 52. The target value filter 53 is provided in order to make the valve opening degree command value θv* to change gradually, thereby suppressing overshoot of response to step-like changes in the valve opening degree command value θv*.

In the present embodiment, the target value filter 53 has a transfer function H (s) expressed by Equation (10) indicated below.

$$H(s)=Ki/(Kps+Ki)$$ Equation (10)

Ki is an integral gain used in the PID control unit 55. Kp is a proportional gain used in the PID control unit 55. In addition, s is a Laplace operator. The angle deviation computation unit 54 computes a deviation $\Delta\theta v$ ($=\theta v^* \cdot H(s)-\theta v$) between a valve opening degree command value, which has been set by the valve opening degree command value setting unit 52 and passed through the target value filter 53 (hereinafter, referred to as "valve opening degree command value $\theta v^* \cdot H(s)$ after the filter processing"), and a rotation angle (actual angle) $\theta v$ of the valve driving motor 15, which is detected by the rotation angle sensor 33.

The PID control unit 55 includes a proportional element 71, an integral element 72, a differential element 73, a first adder 74, and a second adder 75. Note that, Kp is a proportional gain, Ki is an integral gain, 1/Z is a transfer function of a delay element for delaying output of an input signal by one computation period, Kd is a differential gain, and LPF is a low-pass filter. The proportional element 71 computes an operation amount of a proportional action, which is a proportional term, (hereinafter, referred to as "proportional operation amount"), by multiplying the angle deviation $\Delta\theta v$ computed by the angle deviation computation unit 54, by the proportional gain Kp.

The integral element 72 computes an operation amount of an integral action, which is an integral term, (hereinafter, referred to as "integral operation amount"). Specifically, the integral element 72 obtains the present integral operation amount by adding the immediately preceding integral operation amount to a value obtained by multiplying the angle deviation $\Delta\theta v$ computed by the angle deviation computation unit 54, by the integral gain Ki. The proportional operation amount computed by the proportional element 71 and the integral operation amount computed by the integral element 72 are provided to the first adder 74. The first adder 74 computes a valve angular velocity command value $\theta v'^*$ [deg/s] by adding together the proportional operation amount and the integral operation amount. The valve angular velocity command value $\theta v'^*$ is provided to the second adder 75.

The differential element 73 computes an actual valve angular velocity $\theta v'$ [deg/s] by computing a difference ($\theta v$ (n)−$\theta v$ (n−1)) between the present actual angle $\theta v(n)$ (n is a computation period number) detected by the rotation angle sensor 33 and the immediately preceding actual angle $\theta v$ (n−1) detected by the rotation angle sensor 33. After executing first low-pass filter processing on the obtained actual valve angular velocity $\theta v'$, the differential element 73 executes second low-pass filter processing on the actual valve angular velocity $\theta v'$ after the first low-pass filter processing. The differential element 73 computes an operation amount of a differential action, which is a differential term, (hereinafter, referred to as "differential operation amount"), by multiplying the actual valve angular velocity $\theta v'$ after the second low-pass filter processing, by the differential gain Kd. The first low-pass filter processing and the second low-pass filter processing are executed on the actual valve angular velocity $\theta v'$ ($=\theta v$ (n)−$\theta v$ (n−1)) in order to reduce a gain for a frequency domain including and above a predetermined frequency in a gain characteristic of a differential action, thereby suppressing overshoot.

The differential operation amount computed by the differential element 73 is provided to the second adder 75. The second adder 75 computes a current command value I* [A] by subtracting the differential operation amount computed by the differential element 73 from the valve angular velocity command value $\theta v'^*$ computed by the first adder 74. In the present embodiment, the differential element 73 computes the differential operation amount based on a differential value (temporal change amount) of the actual angle $\theta v$, instead of computing the differential operation amount based on a differential value of the angle deviation $\Delta\theta v$ computed by the angle deviation computation unit 54. Such a PID control method is referred to as measured value derivative PID control, or PI-D control for short.

Preferably, the proportional gain Kp, the integral gain Ki, and the differential gain Kd used in the PID control unit 55 are set so as to satisfy Equations (7), (8), and (9), respectively. The angle deviation computation unit 54 and the PID control unit 55 constitute a rotation angle feedback controller that causes the actual angle $\theta v$ of the valve driving motor 15 to follow the valve opening degree command value $\theta v^* \cdot H(s)$ after the filter processing.

The current deviation computation unit 56 computes a deviation $\Delta I$ ($=I^*-I$) between the current command value I* obtained by the PID control unit 55 and motor current (actual current) I detected by the current sensor 36. The PI control unit 57 executes PI computation on the current deviation $\Delta I$ computed by the current deviation computation unit 56. In other words, the current deviation computation unit 56 and the PI control unit 57 constitute a current feedback controller for causing the motor current passing through the valve driving motor 15 to follow the current command value. The PI control unit 57 computes a voltage command value V* [V] that should be applied to the valve driving motor 15 by executing PI computation on the current deviation.

The valve driving motor 15 is expressed as a motor model (1/(L·s+R)) that is a mathematical model. It is considered that the deviation between the voltage command value V* [V] computed by the PI control unit 57 and the induced voltage E [V] is applied to the valve driving motor 15. Thus, the motor current I [I] passes through the valve driving motor 15. The motor current I is detected by the current sensor 36 and fed back to the current deviation computation unit 56.

A value obtained by multiplying the motor current I by a torque constant Kt [N·m/A] of the valve driving motor 15 is a motor torque [N·m]. A value obtained by subtracting a load torque TL [N·m] from the rack shaft 7, from the motor torque Tm is a torque Tv [N·m] that is applied to the hydraulic control valve 14. A value obtained by multiplying the torque Tv by 1/(J·s) is a motor rotation speed $\Omega$ [rad/s]. J is a motor inertia [Kg·m$^2$], and s is a differential operator (Laplace operator). A value obtained by multiplying the motor rotation speed m by a counter electromotive voltage constant Ke [V·s/rad] of the valve driving motor 15 is the induced voltage E [V].

A value obtained by multiplying the motor rotation speed to by 1/s is a rotation angle of the valve driving motor 15. 1/s is an integration operator. The rotation angle sensor 33 detects a rotation angle [deg] of the valve driving motor 15. The rotation angle detected by the rotation angle sensor 33 is fed back to the angle deviation computation unit 54. The torque Tv that is applied to the hydraulic control valve 14 may be expressed as J·d$^2$ ($\theta v$)/dt$^2$.

In this way, feedback control is executed on the valve driving motor 15 such that the opening degree $\theta v$ of the hydraulic control valve 14 coincides with the valve opening degree command value $\theta v^* \cdot H(s)$ after the filter processing. In the valve driving motor control unit 43, if the current feedback loop is omitted, the torque Tv ($=J \cdot d^2$ ($\theta v$)/dt$^2$) that is applied to the hydraulic control valve 14 is expressed by Equation (11) indicated below.

$$J\frac{d^2}{dt^2}\theta v = \left\{ Kp(\theta v^* \cdot H(s) - \theta v) + Ki \int (\theta v^* \cdot H(s) - \theta v)dt - Kd\frac{d}{dt}\theta v \right\} Kt - T_L \quad \text{Equation (11)}$$

where $$H(s) = \frac{Ki}{Kps + Ki}$$

is satisfied.

After execution of Laplace transform on Equation (11), Equation (12) indicated below is obtained.

$$\theta_V = \frac{Kp \cdot Kts + Ki \cdot Kt}{Js^3 + Kd \cdot Kts^2 + Kp \cdot Kts + Ki \cdot Kt} H(s) \cdot \theta_V^* - \frac{s}{Js^3 + Kd \cdot Kts^2 + Kp \cdot Kts + Ki \cdot Kt} T_L \quad \text{Equation (12)}$$

In the right side of Equation (12), a formula, which is multiplied by θv*, expresses the response characteristic with respect to a target value (valve opening degree command value θv*), and a formula, which is multiplied by TL, expresses the response characteristic with respect to disturbance (load torque TL). A transfer function G2 (s) of a system where the current feedback loop is omitted is expressed by Equation (13) indicated below.

$$G2(s) = \frac{\theta v}{\theta v^{*\prime}} \quad \text{Equation (13)}$$
$$= \left( \frac{Kp \cdot Kts + Ki \cdot Kt}{Js^3 + Kd \cdot Kts^2 + Kp \cdot Kts + Ki \cdot Kt} \right) \times \left( \frac{Ki}{Kps + Ki} \right)$$
$$= \frac{Kt \cdot Ki}{Js^3 + Kd \cdot Kts^2 + Kp \cdot Kts + Ki \cdot Kt}$$

From a comparison between the transfer function G2 (s) in the valve driving motor control unit 43 and the transfer function G1 (s) (see Equation 3) in the valve driving motor control unit 100 in FIG. 5, it is understood that the denominators are the same, but the term including $s^2$ and the term including s are deleted from the numerator of the transfer function G2 (s). The term including $s^2$ is deleted from the numerator in the transfer function G2 (s) in order to prevent the differential action from acting in response to changes in the valve opening degree command value θv* (target value). Further, the term including s is deleted from the numerator in the transfer function G2 (s), because the target value filter 53 is provided upstream of the angle deviation computation unit 54 in order to make the valve opening degree command value θv* to change gradually.

Kd·Kts2, Kp·Kts, and Ki·Kt in the numerator of the transfer function G1 (s) cause overshoot. Because, among Kd·Kts2, Kp·Kts, and Ki·Kt in the numerator of the transfer function G1 (s), Kd·Kts2 and Kp·Kts are deleted from the numerator of the transfer function G2 (s) of the system according to the present embodiment, overshoot is suppressed.

That is, in the valve driving motor control unit 43, because the valve opening degree command value θv* (target value) is made to change gradually by the target value filter 53, overshoot of response to changes in the target value is suppressed. As can be understood from Equation (12), the response characteristic with respect to disturbance is not influenced by the target value filter 53. Therefore, the target value following characteristic is improved without deteriorating the disturbance suppression characteristic.

Figure 3:
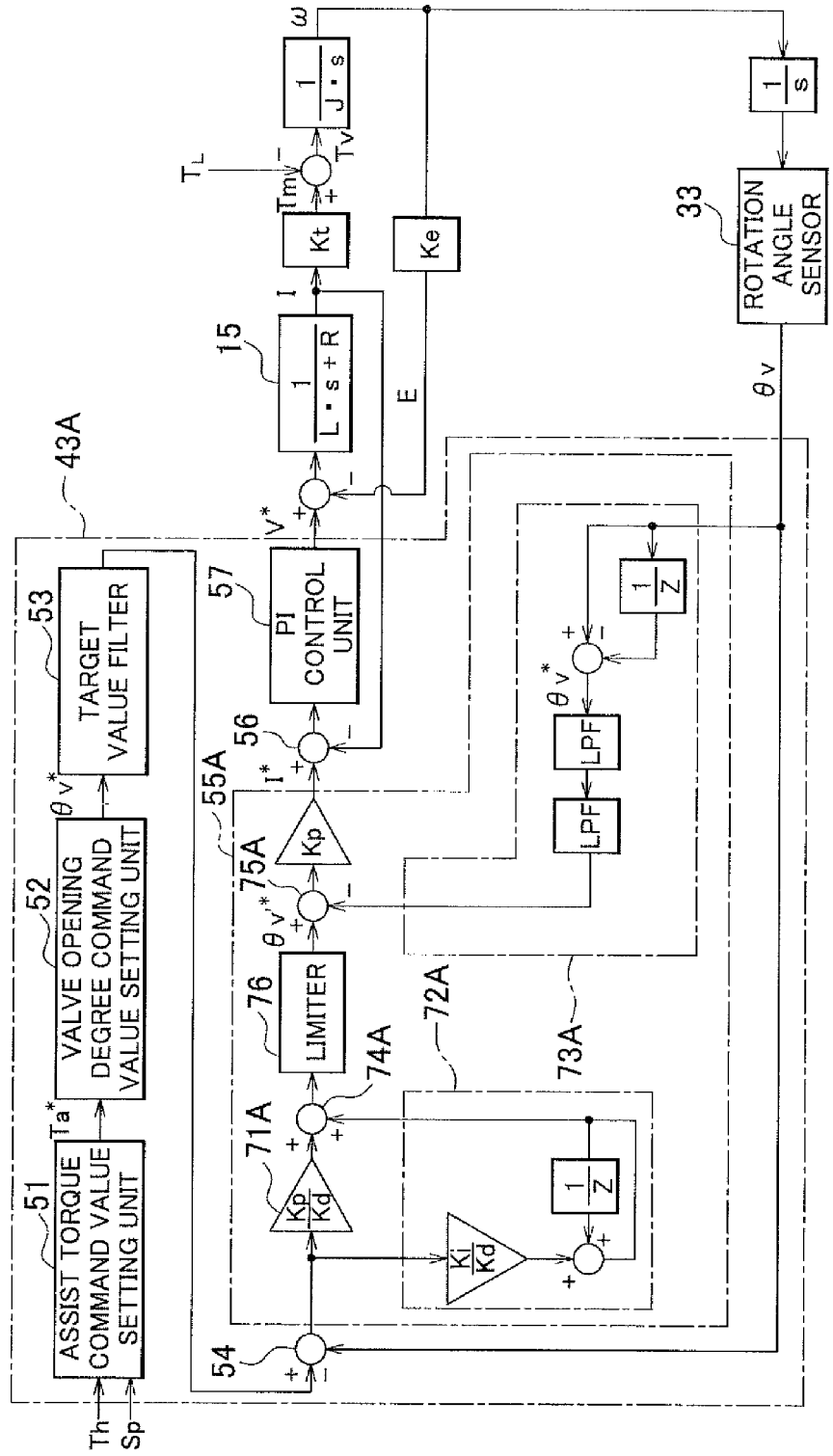
FIG. 3 is a control block diagram illustrating another example of a valve driving motor control unit.

Because the differential element 73 computes the differential operation amount based on a differential value (temporal change amount) of the actual angle θv, the differential action does not occur in response to changes in the target value (valve opening degree command value θv*). Thus, overshoot of response to changes in the target value is further suppressed. FIG. 3 is a control block diagram illustrating another example of a valve driving motor control unit. In FIG. 3, the same reference numerals as those in FIG. 2 are used to indicate the same portions as those in FIG. 2.

A valve driving motor control unit 43A includes an assist torque command value setting unit 51, a valve opening degree command value setting unit 52, a target value filter 53, an angle deviation computation unit 54, a PID control unit 55A, a current deviation computation unit 56, and a PI control unit 57 as function implementation units that are implemented through software processing. A comparison between the valve driving motor control unit 43A and the valve driving motor control unit 43 in FIG. 2 indicates that the only difference is the PID control unit 55A. Therefore, only the PID control unit 55A will be described below.

The PID control unit 55A includes a proportional element 71A, an integral element 72A, a differential element 73A, a first adder 74A, a limiter 76, and a second adder 75A. Kp is a proportional gain, Ki is an integral gain, 1/Z is a transfer function of a delay element for delaying output of an input signal by one computation period, Kd is a differential gain, and LPF is a low-pass filter. The proportional element 71A obtains a proportional operation amount by multiplying an angle deviation Δθv computed by the angle deviation computation unit 54, by a first gain (Kp/Kd). The first gain is a value obtained by dividing the proportional gain Kp by the differential gain Kd.

The integral element 72A obtains an integral operation amount based on the angle deviation Δθv computed by the angle deviation computation unit 54. Specifically, the integral element 72A obtains the present integral operation amount by adding the immediately preceding integral operation amount to a value obtained by multiplying the angle deviation Δθv by a second gain (Ki/Kd). The second gain is a value obtained by dividing the integral gain Ki by the differential gain Kd. The proportional operation amount computed by the proportional element 71A, and the integral operation amount computed by the integral element 72A are provided to the first adder 74A. The first adder 74 computes a valve angular velocity command value θv'*[deg/s] by adding together the proportional operation amount and the integral operation amount. The valve angular velocity command value θv'* is provided to the limiter 76.

The limiter 76 is a limiter that imposes a limitation on the valve angular velocity command value θv'*. The limiter 76 limits the absolute value of the valve angular velocity command value θv'* to a value equal to or lower than a limit value (>0) set in advance. When the absolute value of the valve angular velocity command value θv'* is larger than the limit value, the absolute value of the valve angular velocity command value θv'* is set to a value equal to the limit value. The sign of the valve angular velocity command value θv'* remains unchanged. The limit value is set to, for example, a value that is larger than a rated speed [deg/s] of the valve driving motor 15 by a predetermined value A (A>0). The predetermined value A is set to, for example, ⅕ of the rated speed. The valve angular velocity command value θv'* [deg/s] after limit processing is provided to the second adder 75A.

The differential element 73A computes an actual valve angular velocity θv' [deg/s] by computing a difference (θv (n)−θv (n−1)) between the present actual angle θv (n) (n is a computation period number) detected by the rotation angle sensor 33 and the immediately preceding actual angle θv (n−1). After execution of first low-pass filter processing on the obtained actual valve angular velocity θv', the differential element 73 executes second low-pass filter processing on the actual valve angular velocity θv' after the first low-pass filter processing. The actual valve angular velocity θv' after the first low-pass filter processing is provided to the second adder 75A. The second adder 75A computes a deviation Δθv' (θv*−θv') between the valve angular velocity command value θv'* after the limit processing and the actual valve angular velocity θv' after the second low-pass filter processing. The differential element 73A computes a current command value I* [A] by multiplying a speed deviation Δθv' computed by the second adder 75A by a differential gain Kd.

Preferably, the proportional gain. Kp, the integral gain Ki, and the differential gain Kd used in the PID control unit 55A are set so as to satisfy Equations (7), (8), and (9), respectively. With the valve driving motor control unit 43A, the effect similar to that of the valve driving motor control unit 43 in FIG. 2 is obtained. In the valve driving motor control unit 43A, because a limitation is imposed on the valve angular velocity command value θv'* by the limiter 76, an abrupt change in the valve angular velocity command value θv'* is suppressed. Therefore, overshoot of response to an abrupt change in the valve angular velocity command value θv'* is suppressed.

Figure 4:
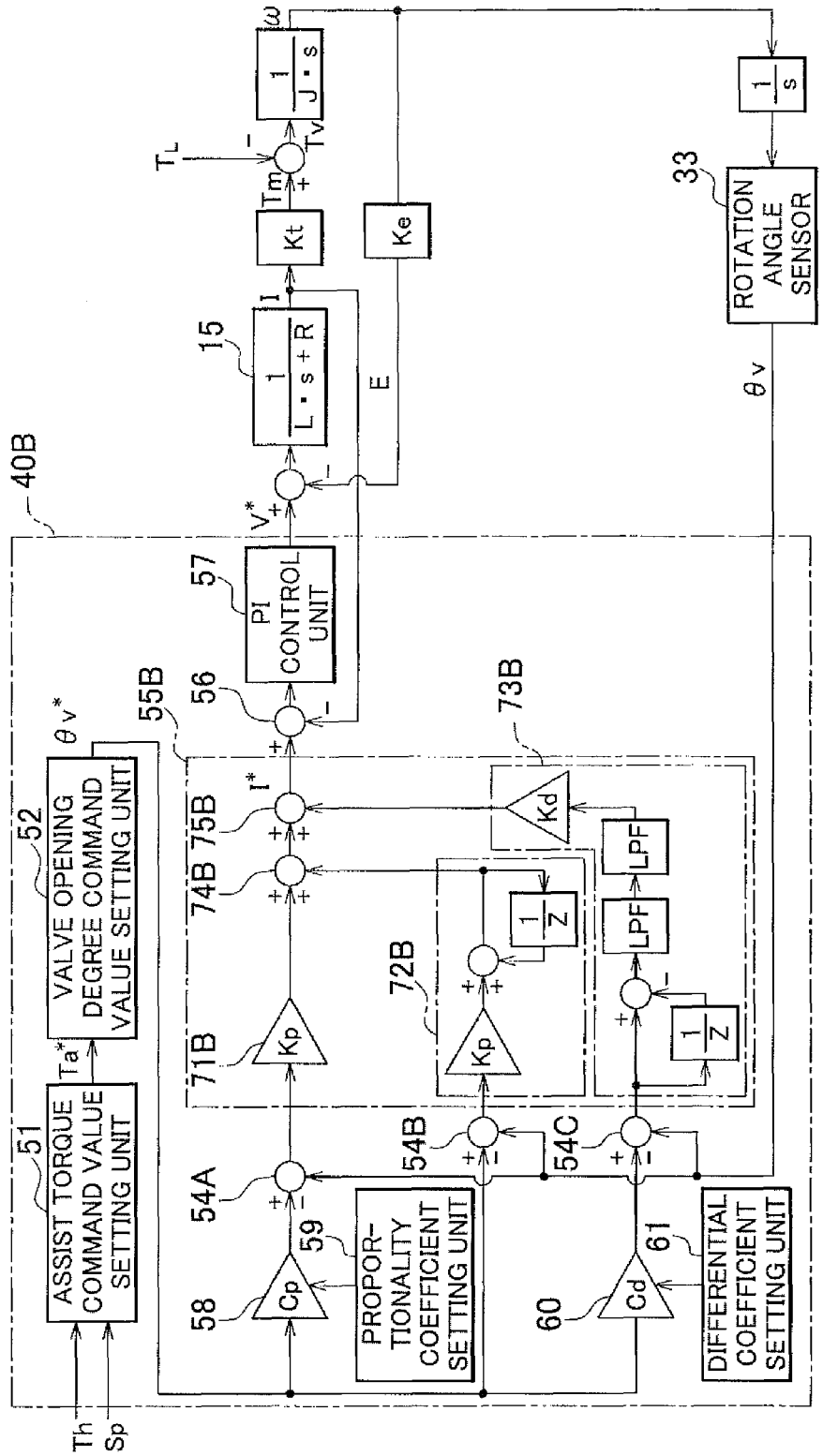
FIG. 4 is a control block diagram illustrating yet another example of the valve driving motor control unit.

FIG. 4 is a control block diagram illustrating yet another example of a valve driving motor control unit. In FIG. 4, the same reference numerals as those in FIG. 2 are used to indicate the same portions as those shown in FIG. 2. A valve driving motor control unit 43B includes an assist torque command value setting unit 51, a valve opening degree command value setting unit 52, a proportionality coefficient multiplication unit 58, a proportionality coefficient setting unit 59, a differential coefficient multiplication unit 60, a differential coefficient setting unit 61, a first angle deviation computation unit 54A, a second angle deviation computation unit 54B, a third angle deviation computation unit 54C, a PID control unit 55B, a current deviation computation unit 56, and a PI control unit 57 as function implementation units that are implemented through software processing.

The valve driving motor control unit 43B does not include the target value filter 53 in the valve driving motor control unit 43 in FIG. 2. In the valve driving motor control unit 43B, the proportionality coefficient multiplication unit 58, the proportionality coefficient setting unit 59, the differential coefficient multiplication unit 60, and the differential coefficient setting unit 61 are provided. In the valve driving motor control unit 43B, the three angle deviation computation units 54A, 54B, 54C are provided. The PID control unit 55B in the valve driving motor control unit 43B is different from the PID control unit 55 in the valve driving motor control unit 43 in FIG. 2.

A valve opening degree command value θv* set by the valve opening degree command value setting unit 52 is provided to the proportionality coefficient multiplication unit 58, the second angle deviation computation unit 54B, and the differential coefficient multiplication unit 60. The proportionality coefficient multiplication unit 58 multiplies the valve opening degree command value θv* [deg] by a proportionality coefficient Cp set by the proportionality coefficient setting unit 59. The proportionality coefficient setting unit 59 sets the proportionality coefficient Cp to a value within a range from 0 to 1. An output value Cp·θv* from the proportionality coefficient multiplication unit 58 is provided to the first angle deviation computation unit 54A. The first angle deviation computation unit 54A computes a deviation Δθv1 (=Cp·θv*−θv) between the output value Cp−θv* from the proportionality coefficient multiplication unit 58, and a rotation angle (actual angle) θv of the valve driving motor 15, which is detected by the rotation angle sensor 33. The deviation Δθv1 will be referred to as "first angle deviation Δθv1" below.

The second angle deviation computation unit 54B computes a deviation Δθv2 (=θv*−θv) between the valve opening degree command value θv* [deg] set by the valve opening degree command value setting unit 52, and the rotation angle (actual angle) θv of the valve driving motor 15, which is detected by the rotation angle sensor 33. The deviation Δθv2 will be referred to as "second angle deviation Δθv2" below. The differential coefficient multiplication unit 60 multiplies the valve opening degree command value θv* [deg] by a differential coefficient Cd set by the differential coefficient setting unit 61. The differential coefficient setting unit 61 sets the differential coefficient Cd to a value within a range from 0 to 1. An output value Cd·θv* from the differential coefficient multiplication unit 60 is provided to the third angle deviation computation unit 54C. The third angle deviation computation unit 54C computes a deviation Δθv3 (=Cd·θv*−θv) between the output value Cd·θv* from the differential coefficient multiplication unit 60, and the rotation angle (actual angle) θv of the valve driving motor 15, which is detected by the rotation angle sensor 33. The deviation Δθv3 will be referred to as "third angle deviation Δθv3" below.

The PID control unit 55B includes a proportional element 71B, an integral element 72B, a differential element 73B, a first adder 74B, and a second adder 75B. Kp is a proportional gain, Ki is an integral gain, 1/Z is a transfer function of a delay element for delaying output of an input signal by one computation period, Kd is a differential gain, and LPF is a low-pass filter. The proportional element 71B obtains a proportional operation amount by multiplying the first angle deviation Δθv1 (=Cp·θv*−θv) by the proportional gain Kp. The integral element 72B obtains an integral operation amount based on the second angle deviation Δθv2 (=θv*−θv). Specifically, the integral element 72B obtains a present integral operation amount by adding the immediately preceding integral operation amount to a value obtained by multiplying the second angle deviation Δθv2 by the integral gain Ki.

The proportional operation amount computed by the proportional element 71B and the integral operation amount computed by the integral element 72B are provided to the first adder 74B. The first adder 74B adds together the proportional operation amount and the integral operation amount. The result of the addition by the first adder 74B is provided to the second adder 75B. The differential element 73B computes a differential operation amount based on the third angle deviation Δθv3 (=Cd·θv*−θv). Specifically, the differential element 73B computes a change amount Δθv3' (=Δθv3 (n)−Δθv3 (n−1)) between the present third angle deviation Δθv3 (n) (n is a computation period number), and the immediately preceding third angle deviation Δθv3 (n−1). After execution of first low-pass filter processing on the obtained change amount Δθv3', the differential element 73B executes second low-pass filter processing on the change amount Δθv3' after the first low-pass filter processing. The differential element 73B computes a differential operation amount by multiplying the change amount Δθv3' after the second low-pass filter processing, by the differential gain Kd. The differential operation amount computed by the differential element 73B is provided to the second adder 75B.

The second adder 75B adds the differential operation amount computed by the differential element 73B to the sum of the proportional operation amount and the integral operation amount, which is the result of addition by the first adder 74B, thus computing a current command value I*. Then, the valve driving motor 15 is controlled by a current feedback controller formed of the current deviation computation unit 56 and the PI control unit 57, such that the motor current I detected by the current sensor 36 coincides with the current command value I*.

Preferably, the proportional gain Kp, the integral gain Ki, and the differential gain Kd that are used in the PID control unit 55B are set so as to satisfy Equations (7), (8), and (9), respectively. In the valve driving motor control unit 43B, if a current feedback loop is omitted, the torque Tv (=J·d³ (θv)/dt²) that is provided to the hydraulic control valve 14 is expressed by Equation (14) indicated below.

$$J\frac{d^2}{dt^2}\theta v = \left\{ Kp(Cp \cdot \theta v^* - \theta v) + Ki \int (\theta v^* - \theta v)dt + Kd\frac{d}{dt}(Cd \cdot \theta v^* - \theta v) \right\} Kt - T_L \quad \text{Equation (14)}$$

After execution of Laplace transform on Equation (14), Equation (15) indicated below is obtained.

$$\theta v = \frac{Cd \cdot Kd \cdot Kts^2 + Cp \cdot Kp \cdot Kts + Ki \cdot Kt}{Js^3 + Kd \cdot Kts^2 + Kp \cdot Kts + Ki \cdot Kt}\theta v^* + \frac{s}{Js^3 + Kd \cdot Kts^2 + Kp \cdot Kts + Ki \cdot Kt}T_L \quad \text{Equation (15)}$$

In the right side of Equation (15), a formula, which is multiplied by θv*, expresses the response characteristic with respect to a target value (valve opening degree command value θv*), and a formula, which is multiplied by TL, expresses the response characteristic with respect to disturbance (load torque TL). A transfer function G3 (s) of a system where the current feedback loop is omitted is expressed by Equation (16) indicated below.

$$G3(s) = \frac{\theta v}{\theta v^*} = \frac{Cd \cdot Kd \cdot Kts^2 + Cp \cdot Kp \cdot Kts + Ki \cdot Kt}{Js^3 + Kd \cdot Kts^2 + Kp \cdot Kts + Ki \cdot Kt} \quad \text{Equation (16)}$$

Each term in the numerator of the transfer function G3 (s) causes overshoot. In order to suppress overshoot, it is preferred to make each term in the numerator of the transfer function G3 (s) small. The term, Cd·Kd·Kts², in the numerator of the transfer function G3 (s) includes the differential coefficient Cd. The term, Cp·Kp·Kts, in the numerator of the transfer function G3 (s) includes the proportionality coefficient Cp. Therefore, it is possible to make the value of Cd·Kd·Kts² small by setting the differential coefficient Cd to a value smaller than 1. Similarly, it is possible to make the value of Cp·Kp·Kts by setting the proportionality coefficient Cp to a value smaller than 1. Therefore, it is possible to suppress overshoot. As can be understood from Equation (15), the response characteristic with respect to disturbance is not influenced by the proportionality coefficient Cp and the differential coefficient Cd.

When the differential coefficient Cd and the proportionality coefficient Cp are set to zero, both the term, Cd·Kd·Kts², and the term, Cp·Kp·Kts, in the numerator of the transfer function G3 (s) are zero. Therefore, the transfer function G3 (s) is equal to the transfer function G2 (s) (see Equation (13)) of the valve driving motor control unit 43 in FIG. 2. With the valve driving motor control unit 43B, by adjusting the proportionality coefficient Cp and the differential coefficient Cd, overshoot of response to changes in the valve opening degree command value θv* (target value) is suppressed without changing the disturbance suppression characteristic. Thus, the target value following characteristic is improved without deteriorating the disturbance suppression characteristic.

The embodiments of the invention have been described above, but the invention may be implemented in various other embodiment. For example, in the valve driving motor control units 43, 43B in FIG. 2 and FIG. 3, the differential operation amount is computed based on the temporal change amount (differential value) of the actual angle θv detected by the rotation angle sensor 33. Alternatively, the differential operation amount may be computed based on a differential value of the angle deviation Δθv computed by the angle deviation computation unit 54.

The case in which the invention is applied to a system used to control a valve driving motor of a hydraulic power steering system has been described above. However, the invention may be applied to any control system as long as the control system executes PID control. Further, various design changes may be made within the scope of the invention defined in the appended claims.

What is claimed is:

1. A PID control system that controls a valve driving motor for a hydraulic control valve in a hydraulic power steering system, comprising:
   a controller that is structured to:
   control a controlled object;
   set a target value;
   detect a controlled variable of the controlled object;
   execute PID control such that the controlled variable detected coincides with the target value set;
   compute a proportional operation amount based on a deviation between the controlled variable detected and an output value from multiplying the target value set by a set proportionality coefficient, wherein the set proportionality coefficient is a value within a range from 0 to 1;
   compute an integral operation amount based a deviation between the target value set and the controlled variable detected;
   compute a differential operation amount based on a deviation between the controlled variable detected and an output value from multiplying the target value set by a set differential coefficient, wherein the set differential coefficient is a value within a range from 0 to 1; and
   add together the proportional operation amount, the integral operation amount, and the differential operation amount.

2. A PID control system that controls a valve driving motor for a hydraulic control valve in a hydraulic power steering system, comprising:
a controller that is structured to:
control a controlled object;
set a target value;
detect a controlled variable of the controlled object;
execute PID control such that the controlled variable detected coincides with the target value set;
execute low-pass filter processing on the target value set using a filter, wherein the filter has a transfer function $H(s)$ expressed as $H(s)=Ki/(Kps+Ki)$, where Kp is a proportional gain used in the controller, Ki is an integral gain used in the controller, and s is a Laplace operator;
compute a proportional operation amount based on a deviation between the target value after the low-pass filter processing and the controlled variable detected;
compute an integral operation amount based on the deviation between the target value after the low-pass filter processing and the controlled variable detected;
compute a differential operation amount based on a temporal change amount of the controlled variable detected;
add together the proportional operation amount, the integral operation amount and the differential operation amount;
limit an output value from adding together the proportional operation amount and the integral operation amount based on a predetermined limit value; and
compute a deviation between the output value that is limited and the temporal change amount of the controlled variable detected.

* * * * *